US006932688B2

(12) United States Patent
Stanley et al.

(10) Patent No.: US 6,932,688 B2
(45) Date of Patent: Aug. 23, 2005

(54) APPARATUS FOR AUTOMATICALLY STUFFING FOOD CASING

(75) Inventors: Thomas R. Stanley, Danville, IL (US); Mark D. Kelley, Kansas City, MO (US); Philip W. Davis, Oakwood, IL (US); Mark L. Fox, Pleasant Valley, MO (US); Thomas D. Weston, Williamsport, IN (US); David L. Wright, Oakwood, IL (US)

(73) Assignee: Teepak Properties, LLC, Lisle, IL (US)

( * ) Notice: Subject to any disclaimer, the term of this patent is extended or adjusted under 35 U.S.C. 154(b) by 0 days.

(21) Appl. No.: 09/976,135

(22) Filed: Oct. 12, 2001

(65) Prior Publication Data

US 2003/0073397 A1 Apr. 17, 2003

(51) Int. Cl.[7] .............................................. A22C 11/12
(52) U.S. Cl. ........................................ 452/48; 452/46
(58) Field of Search ............................... 452/22, 30, 31, 452/32, 33, 34, 35, 37, 40, 41, 42, 43, 45, 46, 47, 48, 177, 179, 180, 181, 183

(56) References Cited

U.S. PATENT DOCUMENTS

| | | | |
|---|---|---|---|
| 3,601,845 A | 8/1971 | Mavrich | 17/35 |
| 4,017,941 A | 4/1977 | Raudys | 17/41 |
| 4,044,425 A | 8/1977 | Nausedas | 17/35 |
| 4,218,861 A | 8/1980 | Marz | 53/138 |
| 4,401,329 A | 8/1983 | Pedroia | 289/18.1 |
| 4,539,796 A | 9/1985 | Nakamura | 53/576 |
| 4,602,402 A | 7/1986 | Schnell | 17/33 |
| 4,612,684 A | 9/1986 | Kollross | 17/45 |
| 4,671,042 A | 6/1987 | Moekle | 53/122 |
| 4,694,537 A | 9/1987 | Kollross | 17/49 |
| 4,709,450 A | 12/1987 | Stanley | 17/49 |
| 4,712,273 A | 12/1987 | Wagner | 17/37 |
| 4,720,010 A | 1/1988 | Bertram | 206/345 |
| 4,773,128 A | 9/1988 | Stanley | 17/49 |
| 4,847,951 A | 7/1989 | Kollross | 17/33 |
| 5,100,364 A | 3/1992 | Kollross | 452/185 |
| 5,147,239 A | 9/1992 | Staudenrausch | 452/47 |
| 5,156,567 A * | 10/1992 | Gammon et al. | 452/48 |
| 5,203,759 A | 4/1993 | Torres | 493/214 |
| 5,269,116 A | 12/1993 | Roberts | 53/138.4 |
| 5,405,288 A | 4/1995 | Stanley | 452/48 |
| 5,755,022 A | 5/1998 | Whittlesey | 29/788 |
| 5,890,955 A | 4/1999 | Stanley | 452/48 |

FOREIGN PATENT DOCUMENTS

| | | | |
|---|---|---|---|
| CA | 884820 | | 11/1971 |
| CA | 986871 | | 4/1976 |
| CA | 1213779 | | 11/1986 |
| DE | 40 35 939 | A1 | 5/1992 |
| DE | 4035939 | * | 5/1992 |
| EP | 0 021 188 | | 1/1981 |
| EP | 0 570 253 | | 11/1993 |
| EP | 0 937 403 | | 8/1999 |
| EP | 1 042 957 | | 10/2000 |
| FR | 2576751 | * | 8/1986 |
| FR | 2 587 006 | | 3/1987 |
| FR | 2 620 902 | | 3/1989 |
| FR | 2 693 429 | | 1/1994 |
| GB | 1 576 718 | | 10/1980 |

* cited by examiner

Primary Examiner—Peter M. Poon
Assistant Examiner—David J Parsley
(74) Attorney, Agent, or Firm—Fish & Richardson P.C.

(57) ABSTRACT

A clipping device is provided for closing stuffed food casing with a clip and an apparatus is provided for causing a taped, holding string loops, to be directed toward the clipping device for closing an end of the food casing so that a string loop is transferred directly from the tape into an entry into a channel in the clipping device. The clip draws the loop to the casing and holds the loop to the food casing. The stuffing apparatus preferably also includes a novel readily cleanable food flow cut-off valve. A punch and clip anvil is provided to apply clips bent around the casing in essentially mirror image helixes. An extending and retracting conveyor is provided to remove stuffed food product from the vicinity of the clipping device after stuffed food casing is closed.

16 Claims, 10 Drawing Sheets

APPARATUS FOR AUTOMATICALLY STUFFING FOOD CASING

BACKGROUND OF THE INVENTION

This invention relates to apparatus for automatically stuffing tubular food casing with food product, especially meat type products such as sausage meat.

There have been a number of problems associated with known food casing stuffing machines. In particular, there has been no reliable way to automatically attach hanging loops, especially string loops, to the end of a stuffed food casing product. It has been difficult to control the flow of meat through the stuffing horn so that flow reliably starts and stops so that the flow properly fills the casing and so that food product does not continue to leave the stuffing horn after the desired section of food casing is filled. Further, it has been difficult to clean devices that control the flow of food product. There has further been a problem with existing apparatus for stuffing tubular food casings with respect to speed of processing. Cycle times for automatically stuffing food casing have not been as fast as desired. Another problem associated with existing apparatus for stuffing and closing tubular food casings has been a tendency for some clips to improperly bend around an end of a stuffed food casing link, e.g. a sausage link, to properly close the casing without leakage, injury to the casing, process interruption or sharp points extending from the closure. A further problem has been that conveyors for moving stuffed food casing product from a closure area have not been sufficiently adaptable to handle various lengths of food casing links, including slack filled links and that to the extent that such conveyors were adaptable, they sometimes extended and retracted relative to the frame of the apparatus thus creating a striking hazard to personnel in the area of the conveyor when it extended.

It is therefore an object of the invention to eliminate or ameliorate the problems as above described in addition to other problems subsequently described.

BRIEF DESCRIPTION OF THE INVENTION

In accordance with the invention an apparatus is provided for automatically stuffing tubular food casing with food product. The apparatus, in a preferred embodiment includes a stuffing horn through which food product flows into tubular food casing which is deshirred from a shirred food casing stick on the stuffing horn. An input end of the stuffing horn is interconnected with a pressurized source of food product. Preferably, a clipping device is provided for closing stuffed food casing with a clip and apparatus is provided for causing a tape, holding lengths of string having end portions secured together to form string loops, to be directed toward the clipping device for closing an end of the food casing so that a string loop is transferred directly from the tape into an entry into a channel in the clipping device so that when the end of the food casing is closed with the clip, the clip draws the loop to the casing and holds the loop to the food casing between a major portion of the loop and the secured together end portions of the string. The apparatus for causing the tape to be directed toward the clipping device includes a plurality of rolls. At a minimum, the rolls usually include a tape supply roll, a takeup roll and at least one intermediate roll which is proximate the entry to the channel so that the secured together end portions of a string project from the tape into the entry into the channel as the tape passes around the intermediate roll.

The apparatus includes a drive section for driving the takeup roll to pull the tape from the supply roll around the intermediate roll and an edge is provided for releasing secured together end portions of a string loop as it passes around the intermediate roll to cause the secured together portions of the string to protrude from the tape into the entry to the channel and to assist in removal of the string loop from the tape. Preferably an air source is further provided that directs the secured together end portions of the string loop into the entry to the channel. Desirably, the secured together portions of the string are secured together by a knot.

The apparatus includes a stuffing horn through which food product flows into tubular food casing deshirred from a shirred food casing stick on the stuffing horn, an input end of the stuffing horn being interconnected with a pressurized source of food product through a food product cut-off apparatus. The cut-off apparatus preferably includes a valve that has a tapered valve seat having a frustoconical tapered side wall and having opposing inlet and outlet openings in the side wall. The valve further has a frustoconical plastic insert tapered to mate with the tapered valve seat for insertion into the valve seat. The plastic insert has a longitudinal axis and a hole passing through the insert perpendicularly to the longitudinal axis in a position such that it may be rotated to cause the hole to align with the opposing inlet and outlet openings in the side wall of the valve seat to permit food product to pass through the inlet opening in the valve seat, through the hole in the insert and through the outlet opening in the valve seat to the stuffing horn. The insert may also be rotated to cause the hole to become misaligned with the inlet and outlet openings to impede the flow of food product to the stuffing horn.

Apparatus, including two sets of gatherer arms, is provided to radially compress the stuffed food casing to cause a restricted location along a stuffed food casing length and the clipping device is configured to clip the casing at the restricted location. The clipping device is preferably of sufficiently light weight and is driven by a sufficient power source to obtain a clipping cycle time of less than 3 seconds for fully filled casing and less than 5 seconds for slack filled products.

A clip anvil is preferably provided that permits spaced clips to be simultaneously applied to the casing at the restricted location so that the clips are bent around the casing in essentially mirror image helixes.

A conveyor is desirably provided to remove stuffed food product from the vicinity of the clipping device after stuffed food casing is closed. The conveyor includes a conveying belt that travels over slacker idler rollers beneath a conveying surface of the belt. The slacker idler rollers permit the length of the conveying surface to be extended and retracted to extend and reduce a space between the clipping device and the conveying surface so that the gatherer arms and clipping device can operate free from obstruction by the conveyor.

Apparatus, including at least one conveyor drive cylinder, is provided to cause the conveyor to retract to increase the space when gatherers for the clipping device are operating to gather stuffed food casing to form a radial restriction in the stuffed food casing and to extend to reduce the space and place the conveying surface near the clipping device when the gatherers are dormant. The stroke of the apparatus, for increasing and decreasing the space, is adjustable to permit distance between sets of gathering arms to be increased and decreased thus permitting an unstuffed length of casing between the closed sets of gathering arms to be withdrawn from the stuffing horn to allow for slack filled (incompletely filled) casing.

DETAILED DESCRIPTION OF THE INVENTION

"Automatically stuffing" as used herein means the stuffing of food casing utilizing machine components and electronic and pneumatic controls, essentially without manual intervention, except for loading food casing onto a stuffing horn, loading food product into a storage area for feeding a food product pump, loading clips into a clipper and loading reels of tape containing string loops. It is understood that manual correction of problems slowing down or stopping stuffing operation is permitted.

"Food casing" means a tubular food casing of film material including reinforced (fibrous) or unreinforced precipitated or regenerated cellulose in the form of seamless or seamed tubes. Tubular casings extruded from other materials, e.g. collagen and extruded synthetic plastics are also contemplated. The preferred tubular material is fiber reinforced cellulose.

"Food product" includes essentially any food product that can be stuffed in a food casing, e.g. sausage meat, ham, turkey and cheese. The preferred food product is a pumpable food product.

"Shirred" means a tubular food casing compressed along its longitudinal axis while forming folds in the casing that are radial or helical to aid axial compression. A "shirred stick" means a length of shirred casing that has a hollow axial passage through its center to allow it to be placed over a stuffing horn.

The invention may be more readily understood by reference to the drawings which illustrate a preferred embodiment. It is to be understood that the preferred embodiment is intended to illustrate and not limit the invention. Embodiments not illustrated in the drawings are not intended to be excluded. For example, any reasonable frame or support structure can be used such as a supporting box structure. Similarly, cutting devices other than a knife, such as a laser or water jet may be used and orientations may be changed. Any means for moving support such as ball bearings, roller bearings, bushings, or wheels may be used. Further, any suitable drive mechanisms, such as pneumatic cylinders, motors of any kind, chains and sprockets, belts and pulleys and gears are contemplated.

Figure 1:
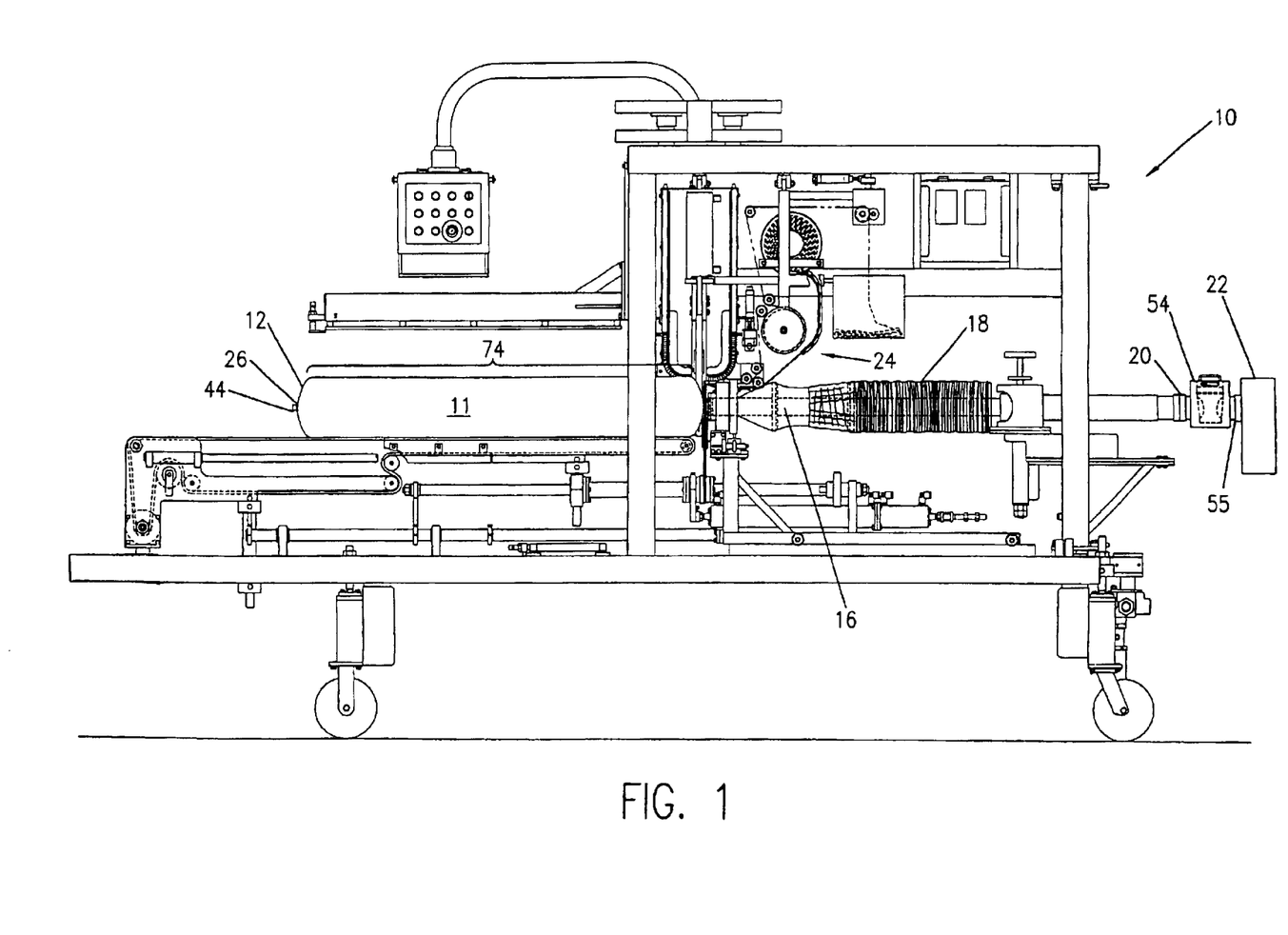
FIG. 1 is an elevational side view of a preferred embodiment of the stuffing apparatus of the invention showing a stuffed food casing link behind which gathering arms have restricted the casing.
Figure 2:
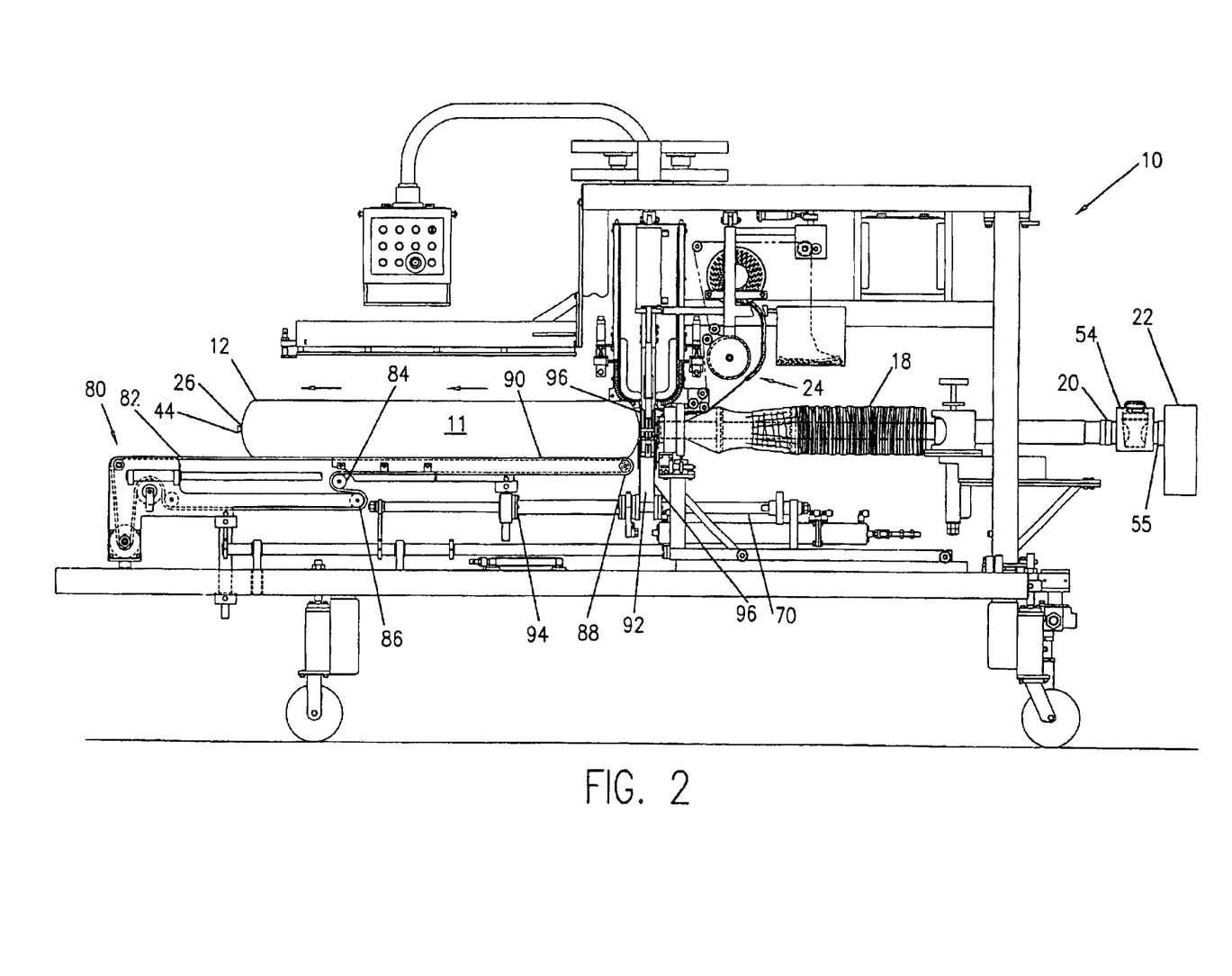
FIG. 2 shows a side elevational view of the apparatus of FIG. 1 in a position where gathering arms have been separated and clips are being applied by the clipping device between the gathering arms. The view further shows food casing being withdrawn from the stuffing horn and a tape containing string loops being directed to the clipping device.

FIG. 1 shows a preferred embodiment of an apparatus 10 of the invention for automatically stuffing a tubular casing 12 with food product. The apparatus includes a stuffing horn 16 through which food product 14 flows into tubular food casing 12 deshirred from a shirred food casing stick 18 on stuffing horn 16. An input end 20 of stuffing horn 16 is interconnected with a pressurized source 22 of food product 14.

The stuffing horn 16 used in the apparatus 10 of the invention is a tube over which is placed a shirred casing 18 and through which food product 14 flows to fill the casing 12. The stuffing horn 16 may be made of any suitable material but usually is stainless steel or food compatible plastic, as are essentially all parts that come in contact with food product 14.

The pressurized source 22 of food product 14 usually includes a food product pump 22 connected between a food product reservoir and a conduit in the form of a stainless steel or food compatible plastic tube, pipe or other conduit to an inlet end 20 of the stuffing horn 16. The food product pump 22 is usually a piston type pump that injects food product 14 through the stuffing horn 16 into the food casing 12. When the food product is in the form of an emulsion or other flowable food product, a cut-off valve 54 is preferably placed in line between an outlet 55 of the pump 22 and the inlet 20 of the stuffing horn 16.

Figures 5, 6, 7:
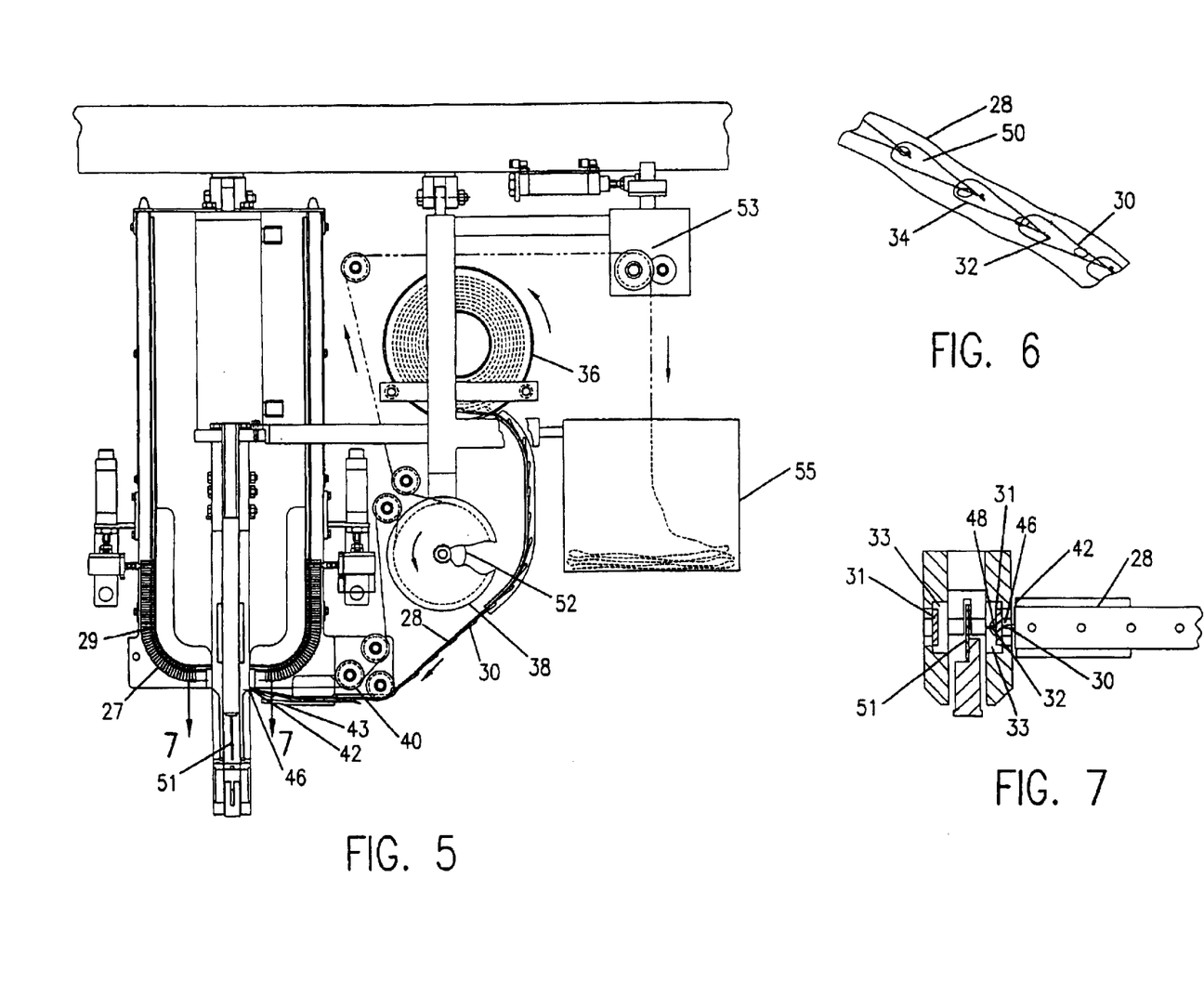
FIG. 5 is a magnified view of the tape containing string loops and the clipping device shown in FIG. 1.
FIG. 6 shows a section of a tape containing string loops.
FIG. 7 is a detail view of the knife cutting clipped casing to release a filled chub and shows punches above applied clips.
Figure 8:
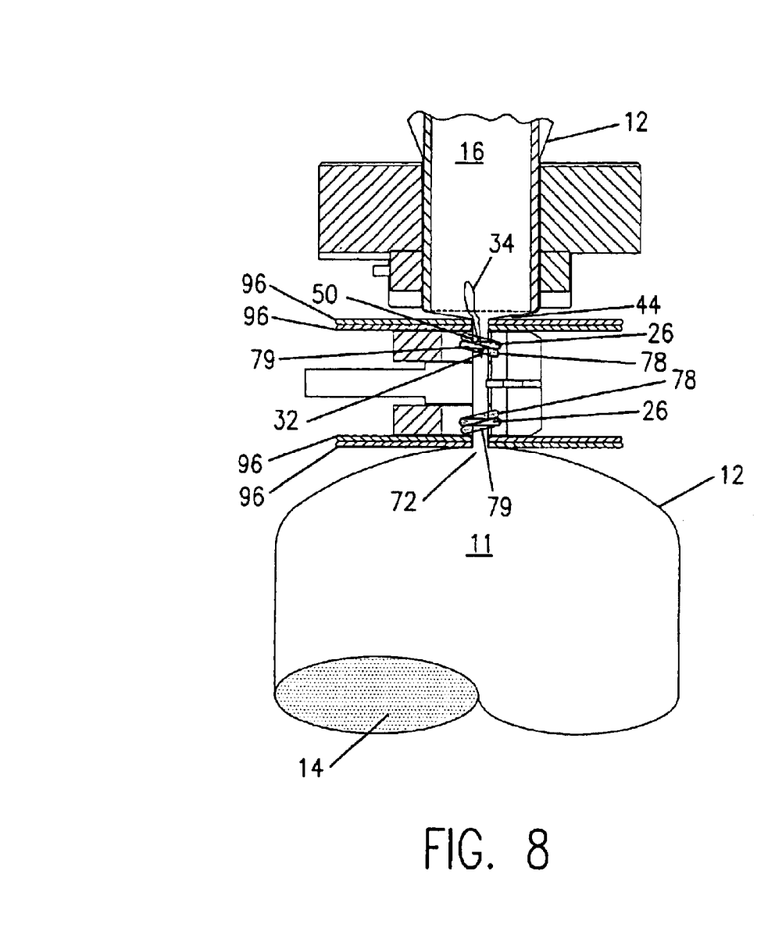
FIG. 8 shows a cross sectional top view of the sets of gathering arms, clipping device, anvil, applied string loop and mirror image applied clips.

A clipping device 24 is provided for closing stuffed food casing 12 with a clip 26 (best seen in FIGS. 5 and 8).

The clipping device 24 acts to apply clips 26 to terminal ends 44 of a stuffed food casing chub 11. The clips 26 are applied in a manner well known for application of clips such as staples, i.e. a U shaped clip is forced over a gathered end 44 of the casing 12 at a restricted location 72 so that ends of the legs of the clip engage an anvil 78 having a curved guide 79 in its surface such that continued pressure provided by a punch 31 on the clip 26 forces the legs to follow the guide 79 to bend them around the casing 12 in a helical configuration. The clip anvil 78 preferably permits spaced clips to be simultaneously applied to the casing at the restricted location 72 so that the clips 26 are bent around the casing in essentially mirror image helixes. For reasons not completely understood, clips 26 are more reliably and efficiently applied when this configuration is used.

The clipping device 24 is configured to rotate into a position such that the punch 31 is above the restricted portion 72 of casing 12 and the anvil 78 is below the restricted portion of the casing to apply one or more clips 26 when needed and to rotate away from the casing 12 when it is not needed. Clips 26, in the form of a strip 27 where the clips 26 are loosely attached to each other in sequence, are loaded into a magazine 29 such that punch 31 traveling in a guide slot channel 33 engages a single clip 26 at an end of the strip 27 that forces the clip 26 down the channel 33, disengaging it from the strip 27 to force the clip 26 over the casing 12 as previously described. When the clipping device 24 is not in a position to be used, it is preferably rotated away from a position above the casing 12.

Usually two clips 26 are simultaneously applied using parallel punches 31 or a single punch 31 having dual punch surfaces. After clipping, a knife 51 is moved into position to sever the casing 12 between applied clips 26 to free a finished stuffed chub 11.

The clipping device 24 is provided with at least one slot 48 for receiving secured together (knotted) end portions 32 of a string loop 34 that when the clip 26 moves down the channel 33 it engages the string loop 34 and carries it down a slot 48 to a restriction 72 of the food casing 12 and traps it between the clip 26 and food casing 12 at a location on the loop portion of the string 30 near the secured together portions 32 of the string 30, usually a knot, so that the string 30 cannot be pulled free without pulling the knot under the clip. The stuffed food casing chub 11 can thus be reliably hung from the string loop 34.

The clipper 24 is made from light materials and strong but light construction design to reduce weight and its movement to the clipping location and movement of the punch 31 is powered by drives of sufficient power to provide a cycle time of from—to—seconds.

As best seen in FIGS. 5 and 6, a tape 28 is provided that carries string loops 34 formed from string 30 to be transferred to clipping device 24 so that the clip 26 draws the string loop 34 to the casing 12 and holds it there between a major portion 50 of the loop 34 and secured together end portions 32 of string 30. Tape 28 is provided from a supply roll 36, around idler rolls 40, an edge 42, a drive roll 52, and a takeup roll 53 to a collection reservoir 55. As the tape moves around edge 42, string loops are freed from the tape primarily due to the sharp bending of the tape. As the loops are freed, the secured together end portions 32 enter into slot 48 in the clipping device 24. The movement of the drive roll 52 is timed so that a loop is released in time to be caught by a clip descending in channel 33 so that it is carried to the casing 12 and trapped between clip 26 and casing 12. An air source 43 is preferably provided to assist in directing the end portion 32 into the entry 46 of slot 48.

In a preferred embodiment, string loops 34 are supplied on a tape 28 which may be almost any fabric or film but is usually a synthetic or natural film such as polyethylene or regenerated cellulose. The string loops 34 are loosely attached to the tape 28, usually by means of a release type contact cement. This permits the loops 34 to be stored and transported on the tape 28 yet also permits the loops 34 to be easily removed by pulling the tape 28 around the edge 42, where the edge 42 either interposes between the string loop 34 and the tape 28 or preferably simply contacts and sharply bends the tape 28 on a surface opposed to the surface on which the string loops 34 are attached to release the loops 34 secured together end portions (knot) 32 first so that the secured together end portions 32 enter the slot 48 in the clipper.

Figure 9:
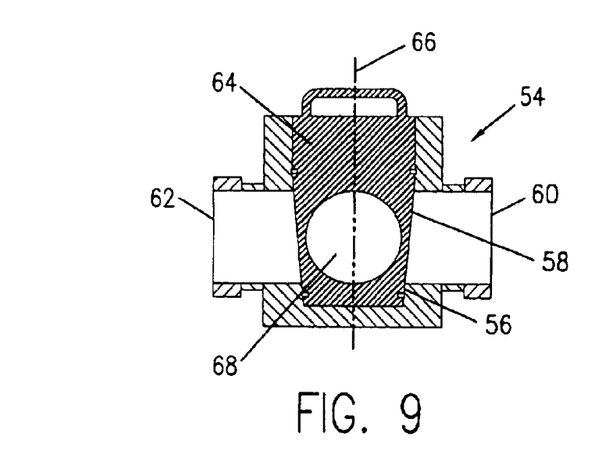
FIG. 9 shows a cross sectional view of a food product cut-off valve of the invention in closed position.
Figure 10:
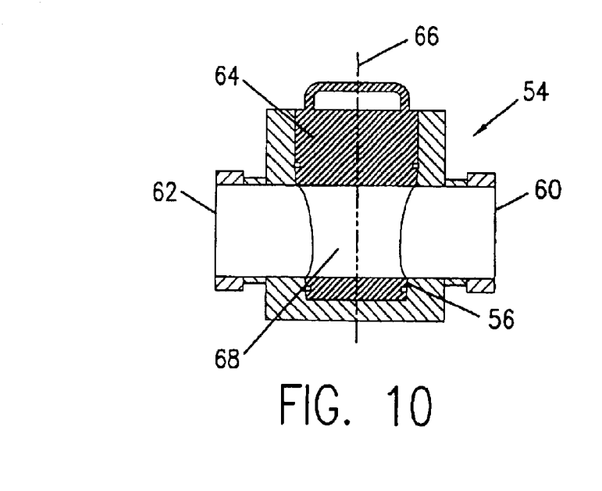
FIG. 10 shows a cross sectional view of a food product cut-off valve of the invention in open position.
Figure 11:
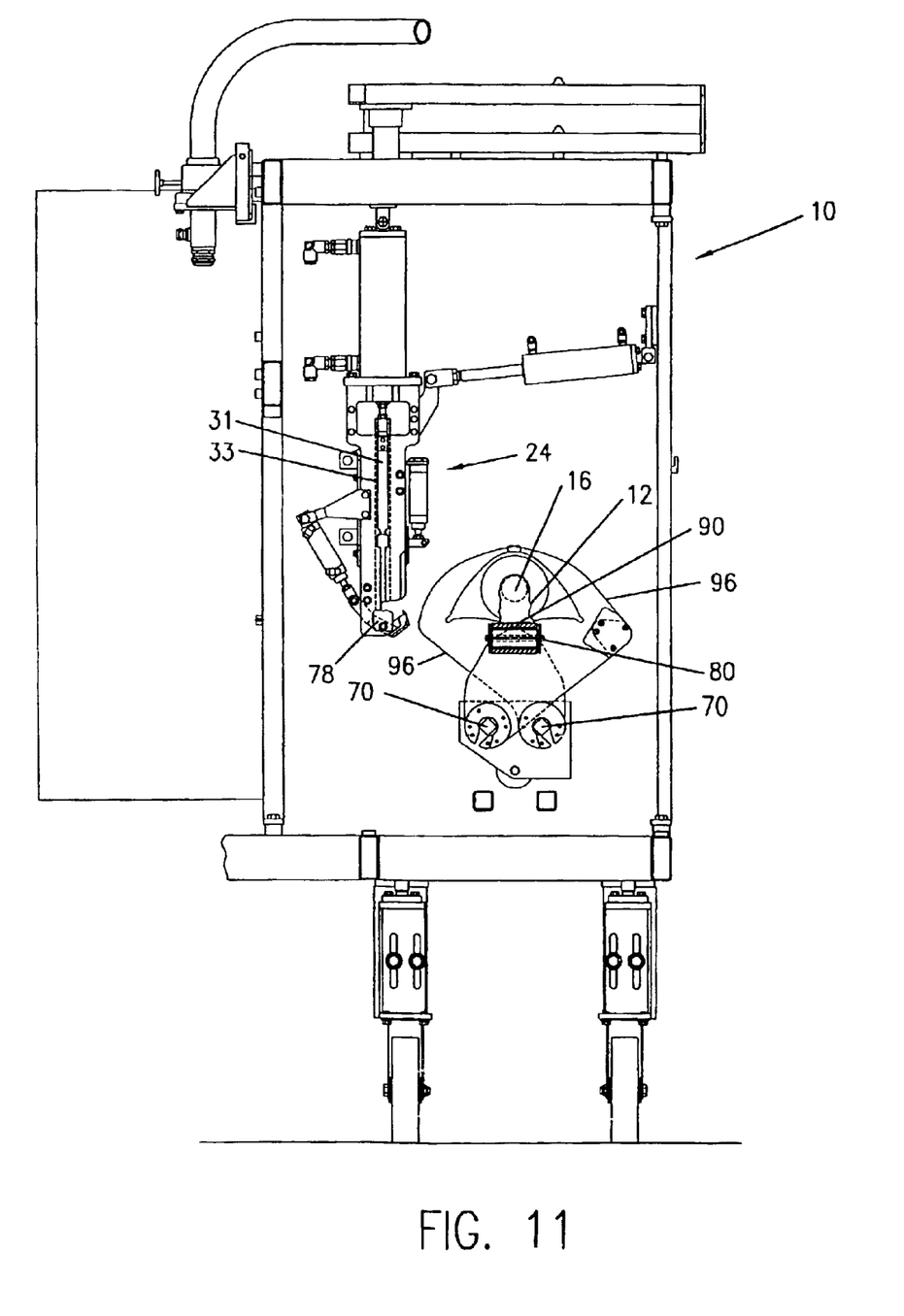
FIG. 11 is an end cross sectional view showing the gathering device with open gathering arms and clipper.
Figure 12:
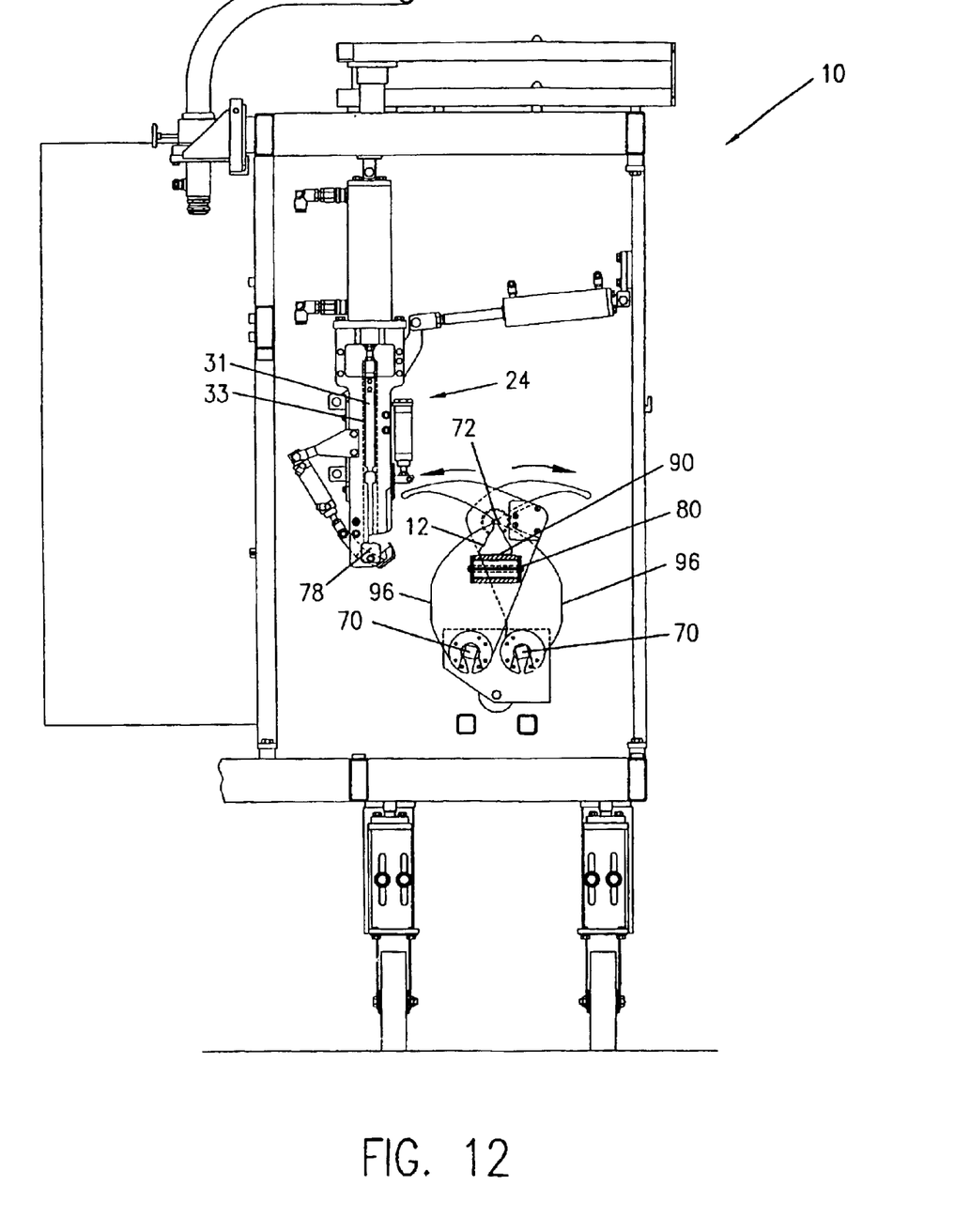
FIG. 12 is an end cross sectional view showing the gathering device with closed gathering arms and clipper.
Figure 13:
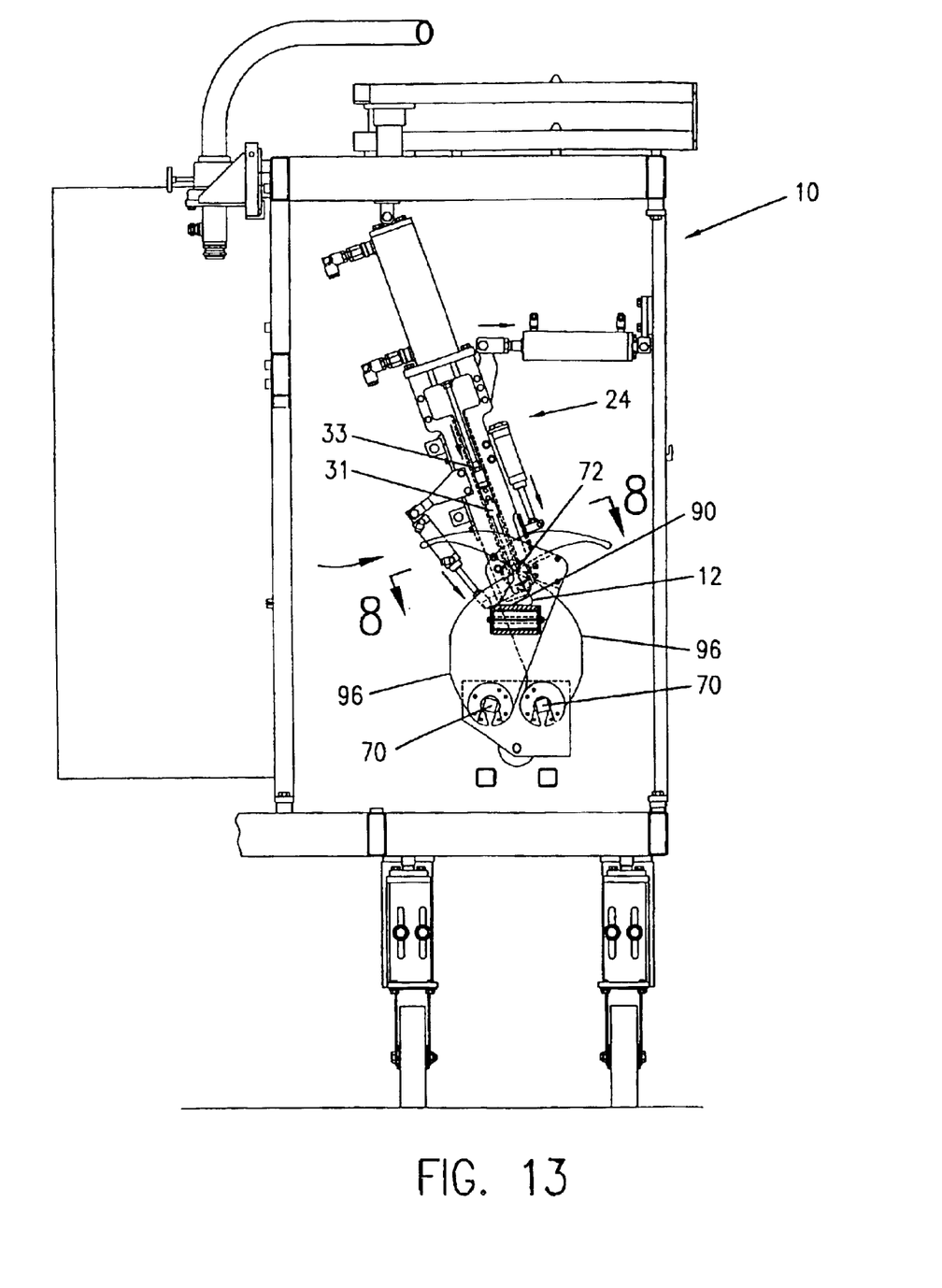
FIG. 13 is an end cross sectional view showing the gathering device with closed gathering arms and clipper moved to clipping position.
Figure 14:
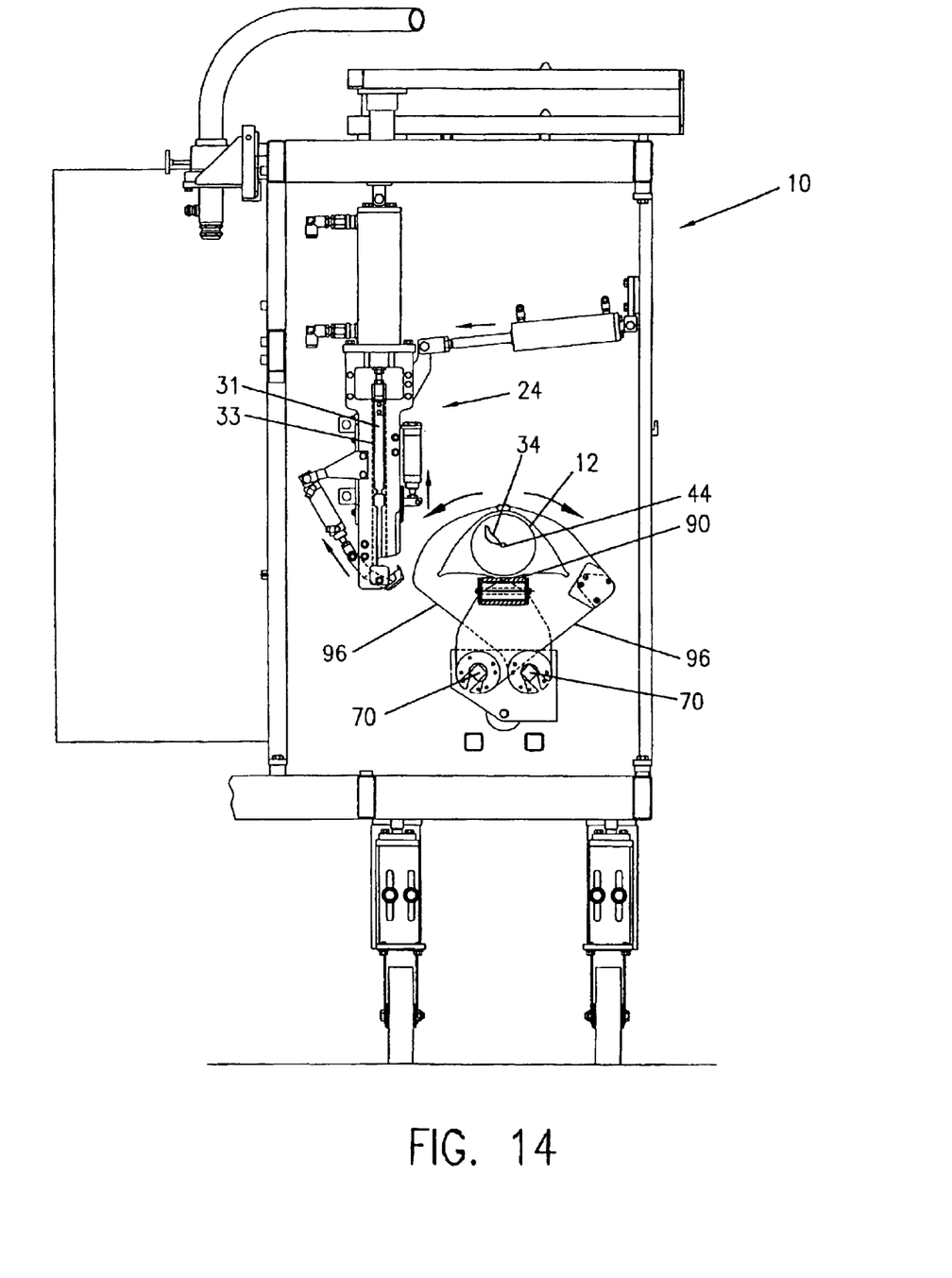
FIG. 14 is an end cross sectional view showing the gathering device with opening gathering arms and clipper moved away from clipping position.

As previously discussed, a cut-off valve 54 is preferably provided that is a valve having a tapered valve seat 56 with a frustoconical tapered side wall 58 with opposing inlet and outlet openings 60 and 62 in the sidewall 58 and a frustoconical plastic insert 64 to mate with the tapered valve seat 56. The plastic insert 64 has a hole 68 passing through the insert 64 essentially perpendicular to its longitudinal axis 66 in a position so that the insert 64 can be rotated about its longitudinal axis 66 to cause the hole 68 to align with the opposing inlet 60 and outlet 62 openings in the sidewall 58 to permit food product 14 to pass through the valve 54 and to permit rotation of the insert 64 to cause misalignment to impede (including completely stop) the flow of food product 14 to the stuffing horn 16. The tapered sidewall 58 is usually made from a food compatible corrosion resistant metal, e.g. stainless steel, but may also be made from a food compatible plastic, e.g. polyethylene, polypropylene, perfluoroethylene (TEFLON®) or nylon. The insert 64 is usually made from a food compatible plastic as above described.

A conveyor 80 is provided for the purpose of removing a finished stuffed and clipped food casing chub 11 from the region of the clipping device 24.

As previously discussed, the conveyor 80 includes a conveying belt 82 that travels over slacker idler rollers 84, 86, and 88 beneath a conveying surface 90 of the belt 82. The belt 82 is preferably a fabric material such as a woven web of rayon or nylon but may be of other suitable material such as in the form of a flexible rubber or elastomeric sheet or a metal mesh. The slacker idler rollers 84, 86 and 88 hold the belt 82 taught and may move to permit the length of the conveying surface 90 to be extended and retracted to extend and reduce a space 92 between the clipping device 24 and the conveying surface 90 so that gatherer arms 96 provided for squeezing the casing to a restriction 72 that can be clipped and the clipping device 24 can operate free from obstruction by the conveyor 80.

Figure 3:
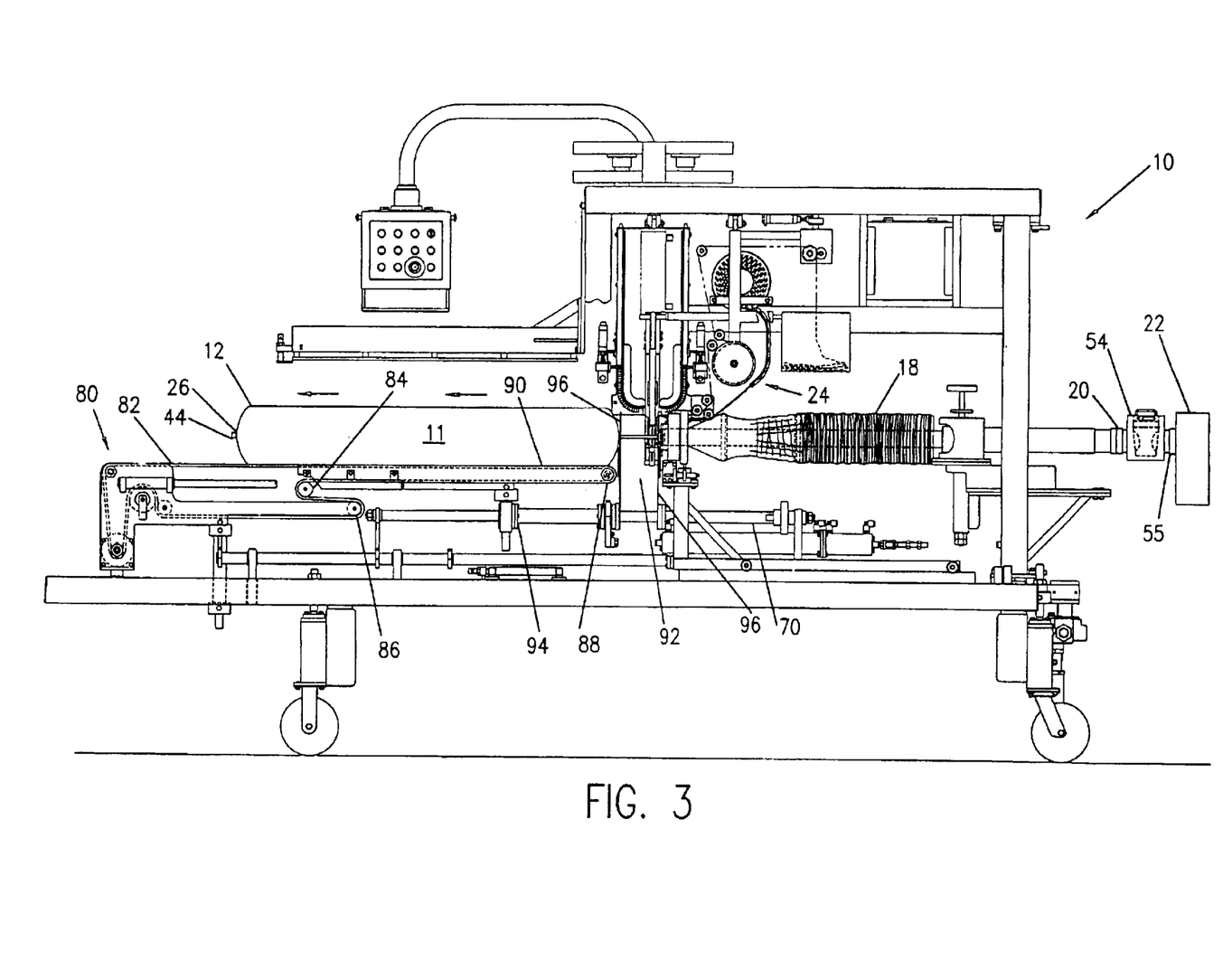
FIG. 3 shows a side elevational view of the apparatus of FIG. 1 in a position where gathering arms have been separated by a larger distance that in the position of FIG. 2 and clips are being applied by the clipping device between the gathering arms to provide a length of unfilled casing to provide a "slack filled" product. The view further shows food casing being withdrawn from the stuffing horn and a tape containing string loops being directed to the clipping device.
Figure 4:
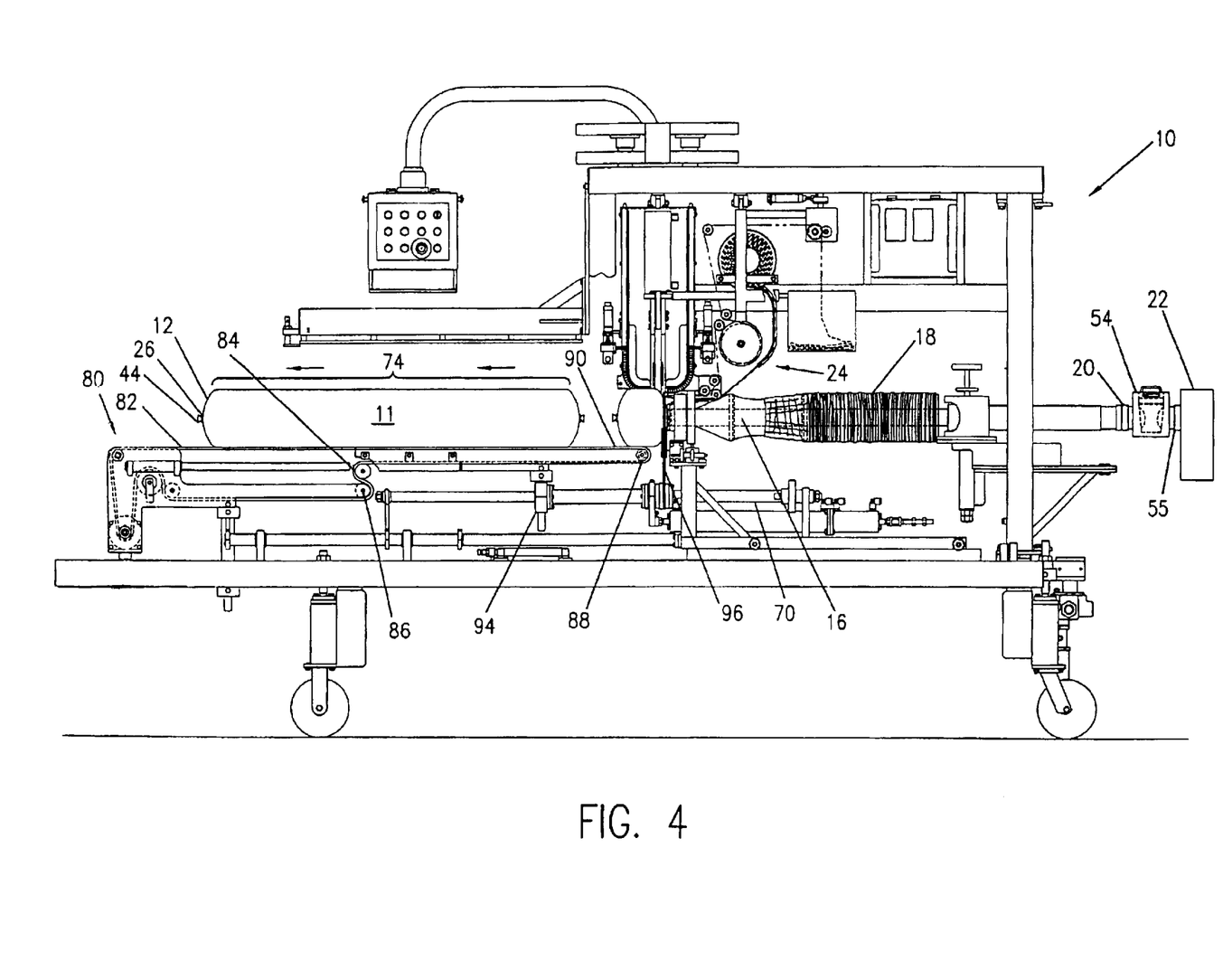
FIG. 4 shows a side elevational view of the apparatus of FIG. 1 in a position where gathering arms have opened, the clipper has been withdrawn and a new length of casing is being stuffed.

Apparatus 94, including at least one conveyor drive cylinder 70, is provided to cause the conveyor to retract to increase the space 92 when gatherers 96 for the clipping device 24 are operating to gather stuffed food casing 12 to form a radial restriction 72 in the stuffed food casing 12 and to extend to reduce the space 92 and place the conveying surface 90 near the clipping device 24 when the gatherers 96 are dormant. The stroke of the apparatus, for increasing and decreasing the space, is adjustable to permit distance between sets of gathering arms 96 to be increased and decreased thus permitting an unstuffed length of casing between the closed sets of gathering arms 96 to be withdrawn from the stuffing horn 16 to allow for slack filled (incompletely filled) casing 12, as shown in FIG. 3.

What is claimed is:

1. An apparatus for automatically stuffing a tubular food casing with food product, the apparatus comprising:
   a stuffing horn through which food product flows into a tubular food casing the stuffing horn including an input end interconnected with a pressurized source of food product;
   a clipping device for closing with a clip the food casing after being stuffed, the clipping device comprising a slot for guiding the clip and an entry into the slot, wherein the entry comprises an aperture in the clipping device;

a tape holding lengths of flexible string having end portions secured together to form flexible string loops, and a source of compressed gas adapted to direct a flow of gas onto a string loop, the tape being directed toward the clipping device and the compressed gas impinging on the string loop so that the string loop is transferred into the entry and into the slot in the clipping device so that a first portion of the string loop protrudes through the entry into the slot while a second portion of the string loop is held simultaneously to the tape, wherein the entry is positioned in the slot and the tape is positioned relative to the entry so that when the food casing is being closed with the clip, the clip draws the loop to the casing and holds the loop between the clip and the food.

2. The apparatus of claim 1 comprising a plurality of rolls including a tape supply roll, a drive roll, a takeup roll and at least one intermediate roll which is proximate the entry so that the secured together end portions of a string loop project from the tape into the entry into the slot as the tape passes around the intermediate roll.

3. The apparatus of claim 2 comprising means for driving the drive roll to pull the tape from the supply roll around the intermediate roll.

4. The apparatus of claim 3 comprising an edge for catching secured together end portions of a string loop as the string loop passes around the intermediate roll to cause the secured together portions of the string to protrude from the tape into the entry to the slot and to assist in removal of the string loop from the tape.

5. The apparatus of claim 1 wherein the secured together portions are secured together by a knot.

6. The apparatus of claim 1 comprising means for radially compressing the food casing after being stuffed to cause a restricted location along a stuffed food casing length, said clipping device being configured to clip the casing at the restricted location.

7. The apparatus of claim 1 wherein the clipping device is of sufficiently light weight and is driven by a sufficient power source to obtain a clipping cycle time of less than 3 seconds.

8. The apparatus of claim 1 wherein a conveyor is provided to remove stuffed food product from the vicinity of the clipping device after a stuffed food casing is closed, said conveyor comprising:

a conveying belt defining a conveying surface having a variable length; and one or more movable slacker idler rollers over which the conveying belt travels, wherein the one or more slacker idler rollers are movable to, permit the length of the conveying surface to be extended and retracted, the idle rollers adapted such that a space between the clipping device and the conveying surface may be enlarged and reduced by retracting and extending the conveying surface length.

9. The apparatus of claim 8 comprising:

gatherers to gather a stuffed food casing to form a radial restriction in the stuffed food casing; and a conveyor drive cylinder to cause the conveyor conveying surface length to retract to increase the space when the gatherers are operating and to cause the conveying surface length extend to reduce the space and place the conveying surface near the clipping device when the gatherers are dormant.

10. The apparatus of claim 1 wherein the compressed gas is air.

11. The apparatus of claim 1 wherein the clip holds the loop to the food casing at two or more points along the loop.

12. The apparatus of claim 1 wherein end portions of the lengths of string have been secured together in knots to form string loops and wherein the first portion of the string loop that protrudes through the entry into the slot comprises a knot.

13. A method for automatically stuffing tubular food casing with food product comprising:

passing food product through a stuffing horn into a tubular food casing where an input end of the stuffing horn is interconnected with a pressurized source of food product;

after the food casing is stuffed, closing the food casing with a clip using a clipping device; and transferring a flexible string loop from a tape into an entry to a slot in the clipping device so that when the food casing is closed with the clip, the clip draws the loop to the casing and holds the string loop to the food casing at two or more points along the string loop, wherein the string loop includes a knot and during the transfer of the string loop, a first portion of the string loop including the knot protrudes through the entry into the slot while a second portion of the string loop is held simultaneously to the tape.

14. The method of claim 13 comprising causing secured together end portions of a string loop as it passes around an edge to protrude from the tape into the entry to the slot and to assist in removal of the string loop from the tape.

15. The method of claim 13 comprising blowing the secured together end portions of the string loop into the entry to the slot using a gas; and capturing two or more portions of the string loop between the clip end and the casing.

16. The method of claim 15 wherein the gas is air.

* * * * *

UNITED STATES PATENT AND TRADEMARK OFFICE
CERTIFICATE OF CORRECTION

PATENT NO. : 6,932,688 B2  Page 1 of 1
APPLICATION NO. : 09/976135
DATED : August 23, 2005
INVENTOR(S) : Thomas R. Stanley et al.

It is certified that error appears in the above-identified patent and that said Letters Patent is hereby corrected as shown below:

Title page,
Item [56], References Cited, U.S. PATENT DOCUMENTS, add

| | | | |
|---|---|---|---|
| -- 3,860,996 | 1/1975 | Kupcikevicius et al. | 452/35 |
| 4,165,593 | 8/1979 | Niedecker | 53/413 |
| 4,437,209 | 3/1984 | Duroyon | 452/32 |
| 4,675,945 | 6/1987 | Evans et al. | 452/48 |
| 4,766,713 | 8/1988 | Evans | 53/138.2 |
| 4,796,332 | 1/1989 | Stanley | 452/48 |
| 4,949,429 | 8/1990 | Stanley | 452/34 |
| 4,969,233 | 11/1990 | Stanley | 452/30 |
| 5,067,313 | 11/1991 | Evans | 53/576 |
| 5,215,495 | 6/1993 | Crevasse | 452/21 |
| 5,238,444 | 8/1993 | Schwimmer et al. | 452/48 |
| 5,885,150 | 3/1990 | Whittlesey | 452/35 |
| 5,842,915 | 12/1998 | Plewa et al. | 452/48 --. |

FOREIGN PATENT DOCUMENTS, add
-- FR 2638942, 5/1990 --.

Column 5,
Line 25, after "34", insert -- so --.

Signed and Sealed this

Twenty-seventh Day of June, 2006

JON W. DUDAS
*Director of the United States Patent and Trademark Office*